(12) United States Patent
    Sharma et al.

(10) Patent No.: US 8,392,737 B2
(45) Date of Patent: Mar. 5, 2013

(54) SYSTEM FOR CONTROLLING POWER CONSUMPTION OF A NETWORK

(75) Inventors: Puneet Sharma, Menlo Park, CA (US);
    Brandon Heller, Stanford, CA (US);
    Priya Mahadevan, Sunnyvale, CA (US);
    Sujata Banerjee, Palo Alto, CA (US);
    Xiaoyun Zhu, Cupertino, CA (US);
    Ram Swaminathan, Cupertino, CA (US); Parthasarathy Ranganathan, Fremont, CA (US)

(73) Assignee: Hewlett-Packard Development Company, L. P., Houston, TX (US)

(*) Notice: Subject to any disclaimer, the term of this patent is extended or adjusted under 35 U.S.C. 154(b) by 286 days.

(21) Appl. No.: 12/817,907

(22) Filed: Jun. 17, 2010

(65) Prior Publication Data
    US 2011/0055611 A1    Mar. 3, 2011

Related U.S. Application Data

(60) Provisional application No. 61/180,611, filed on Jun. 17, 2009.

(51) Int. Cl.
    G06F 1/00        (2006.01)
    G06F 1/26        (2006.01)
    G06F 15/177      (2006.01)
    G06F 15/173      (2006.01)
    H04L 12/28       (2006.01)
    H04M 1/00        (2006.01)

(52) U.S. Cl. ........ 713/324; 713/300; 713/320; 370/254; 370/351; 370/431; 455/574; 709/220; 709/223; 709/238

(58) Field of Classification Search .................. 713/300, 713/320, 324; 370/254, 351, 431; 455/574; 709/220, 223, 238
    See application file for complete search history.

(56) References Cited

U.S. PATENT DOCUMENTS

| 5,596,719 | A | * | 1/1997 | Ramakrishnan et al. | 709/241 |
| 6,151,327 | A | * | 11/2000 | Sofman et al. | 370/437 |
| 7,924,758 | B2 | * | 4/2011 | Park et al. | 370/311 |
| 7,975,069 | B2 | * | 7/2011 | Lee et al. | 709/241 |

OTHER PUBLICATIONS

Joseph Chabarek, Joel Sommers, Paul Barford, Cristian Estan, David Tsiang and Steve Wright, Power Awareness in Network Design and Routing, Infocom, Apr. 2008.

Maruti Gupta, Satyajit Grover and Suresh Singh, A Feasibility Study for Power Management in LAN Switches, Proceedings of the 12th IEEE International Conference on Network Protocols, Oct. 2004.

Maruti Gupta and Suresh Singh, Using Low-power Modes for Energy Conservation in Ethernet LANs, INFOCOM 2007, 26th IEEE International Conference on Computer Communications, Joint Conference of the IEEE Computer and Communications Societies, May 6-12, 2007, Anchorage, Alaska, USA 2007.

(Continued)

*Primary Examiner* — Stefan Stoynov (57) ABSTRACT

A system for controlling power consumption of a network includes at least one terminal to receive a plurality of requests to route data from a plurality of data sources to a plurality of data sinks, where the data sources and the data sinks are connected to each other through a plurality of network nodes forming the network, and a network configuration unit. The network configuration unit includes a selection module configured to select a configuration of the network nodes that allows the network to have a lowest overall power consumption of the network among a plurality of configurations of the network, and an output module configured to output a plurality of instruction signals to the network nodes to perform the network configuration. A network path for transmitting a network flow is selected that does not allow the network flow to be split and flow through another network path.

20 Claims, 4 Drawing Sheets

OTHER PUBLICATIONS

Jeff Mogul, Improving energy efficiency for networked applications, 2006 Hewlett-Packard Development Company, L. P., HP Labs, Palo Alto.

Sergiu Nedevschi, Lucian Popa, Gianluca Iannaccone, Sylvia Ratnasamy, and David Wetherall, Reducing Network Energy Consumption via Sleeping and Rate-Adaptation, EECS Department, University of California, Berkeley, Oct. 29, 2007.

* cited by examiner

SYSTEM FOR CONTROLLING POWER CONSUMPTION OF A NETWORK

PRIORITY

The present application claims priority to U.S. provisional patent application Ser. No. 61/180,611, having a filing date of Jun. 17, 2009, and entitled "A System For Controlling Power Consumption of a Network" by Sharma et al., which is incorporated by reference in its entirety.

STATEMENT OF GOVERNMENT RIGHTS

This invention was made with Government support under Contract No. 0627112 awarded by the National Science Foundation. The Government has certain rights in this invention.

BACKGROUND

A data center is typically made of a network of nodes that communicate data between data sources and data sinks. In communicating data, a network node is generally not power-proportional in that power consumed by the network node is not proportional to the amount of data transferred by the network node. For instance, a switch that has a communication channel on may consume almost the same amount of power in keeping the communication channel on regardless of how much data that the switch transfers. While reliance of a network may be improved by having available communication channels of the network nodes switched on and evenly distributing data traffic across the open communication channels, such a network configuration is often not energy-efficient. Thus, a network configuration that manages network nodes to conserve power while satisfying requests for routing data from data sources and other requirements may be useful.

BRIEF DESCRIPTION OF DRAWINGS

The embodiments of the invention will be described in detail in the following description with reference to the following figures.

SUMMARY OF THE INVENTION

A system, according to an embodiment, for controlling power consumption of a network includes at least one terminal to receive a plurality of requests to route data from a plurality of data sources to a plurality of data sinks. The data sources and the data sinks are connected to each other through a plurality of network nodes forming the network. The system includes a network configuration unit including a selection module and an output module. The selection module is configured to select a configuration of the network nodes that allows the network to have a lowest overall power consumption of the network among a plurality of configurations of the network. The selection is made based on the data routing requests from the data sources. The output module is configured to output a plurality of instruction signals to the network nodes to perform the network configuration.

A method, according to an embodiment, includes receiving a plurality of requests to route data from a plurality of data sources to a plurality of data sinks, wherein the data sources and the data sinks are connected to each other through a plurality of network nodes forming the network. The method further includes selecting a configuration of the network nodes that allows the network to have a lowest overall power consumption of the network among a plurality of configurations of the network, wherein the selection is made based on the data routing requests from the data sources; and outputting a plurality of instruction signals to the network nodes to perform the network configuration. The method may be embodied on one or more non-transitory computer readable data storage mediums.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

As referred to in this disclosure, network information may be any reasonably suitable information for operating a network such as source requests for routing data through a network, quality of service (QoS) requirements associated with the routed data, information on a network topology (for example, how switches are connected in the network, logical and physical locations of the switches in the overall network and in relation to one another and distances between the switches, etc.), other requirements, etc.

As referred to in this disclosure, a network node may be any reasonably suitable node in a network that receives and transfers data to another node or a network device such as a switch, router, repeater, hubs, etc.

As referred to in this disclosure, a terminal may be any reasonably suitable terminal for receiving and/or outputting data for a network such as a LAN port, other physical ports, etc.

As referred to in this disclosure, network information may be any reasonably suitable information for operating a network such as source requests for routing data through a network, quality of service (QoS) requirements associated with the routed data, information on a network topology (for example, how switches are connected in the network, logical and As referred to in this disclosure, a configuration of a network may be any reasonably suitable network configuration such as switching on or off different combinations of network nodes or elements, powering down different combinations of network nodes, setting up network paths for transmitting data, etc. For example, a network node and/or a port of a network node may be powered down by lowering a capacity/rate of a communication channel, for example, from 1 Giga bits per second (Gbit/s) capacity to 100 Mega bits per second (Mbit/s) capacity or from 100 Mbit/s capacity to 10 Mbit/s capacity when data traffic through the communication channel does not require maintaining the 1 Gbit/s link or the 100 Mbit/s link, respectively. Alternatively, if no traffic is flowing through the link, the corresponding communication channel on the switch can be completely tuned off.

According an embodiment, a system for controlling power consumption of a network includes terminals for receiving network information and a network configuration unit for selecting a network configuration based on the network information to achieve a power consumption objective. In one example, the objective is to have a lowest overall power consumption among multiple configurations of the network while satisfying requests for routing data from sources and other requirements. Based on the network configuration selection, the network configuration unit outputs instructions to the network to perform the network configuration. The network configurations may correspond to different combinations of network nodes and/or switches that are to be at least partially powered down, respectively. In determining the network configuration having the lowest overall power consumption, a particular network path for transmitting a network flow for a commodity (e.g., data communicated through a network for an application running at a sink/source) may be selected. The network may be instructed not to allow the network flow to be split and flow through another network path. By allowing the network flow to be split, it might be possible to get a lower power consumption configuration though the throughput of the network might be impacted.

By allowing a selection of a network configuration to have the lowest overall power consumption in routing network data, the network may yield a considerable energy saving with substantially no performance deterioration.

Figure 1:
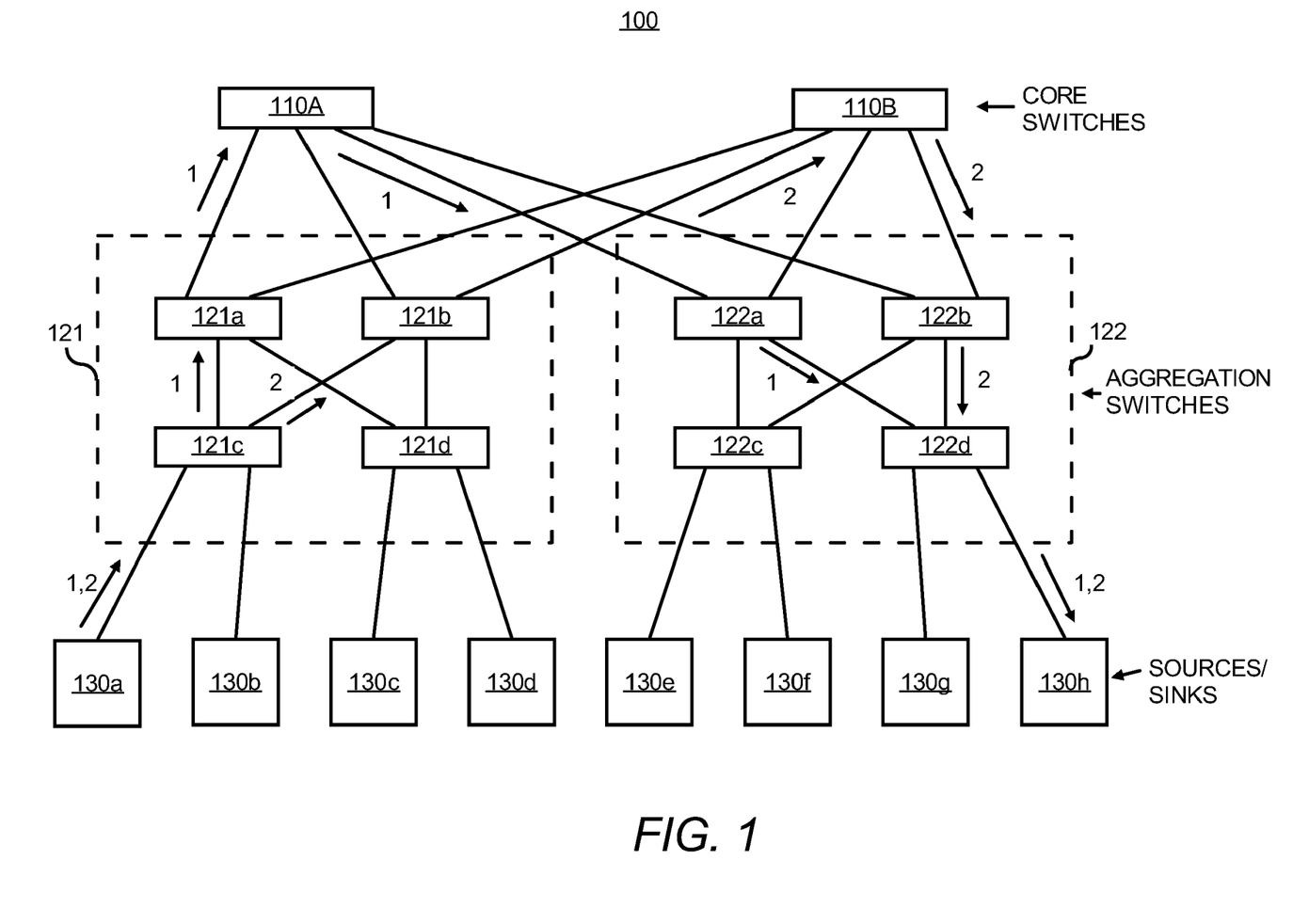
FIG. 1 illustrates a network for routing data from data sources to data sinks according to an embodiment of the invention.

Turning now to FIG. 1, shown therein is a network 100 for routing data from sinks/sources 130a-130h operating as data sources to other ones of the sinks/sources 130a-130h operating as data sinks through aggregation switches 121-122 and core switches 110A-100B according to an embodiment of the invention. It should be understood that the network 100 may include additional components and that some of the components described herein may be removed and/or modified without departing from a scope of the network 100. For example, the network 100 may include more sources/sinks, aggregation switches and core switches than the ones shown in FIG. 1. While the network 100 will be explained below in connection with the switches 110A-B and 121-122 and a reduction of the overall power consumption thereof, the same description and power-reduction features may also be applied to other networks and network nodes such as a router, repeater, hubs, servers, etc.

The core switches 110A-110B may each be any reasonably suitable high-capacity switch positioned in a physical core or a backbone of a network. The core switches 110A-B each serves to interconnect edge switches 121c-121d and 122c-122d positioned at the network edge.

The aggregation switches 121-122 may each be any reasonably suitable switch having a group of switches that are interlinked so that the aggregation switch as a whole has a communication channel/link speed increased beyond the limits of any one single communication channel/link and has redundancy to render the aggregation switch to be operational despite a failure of a component switch. The aggregation switch 121 includes a group of switches 121a-121d, and the aggregation switch 122 includes a group of switches 122a-122d. The edge switches, 121c-121d and 122c-122d, at a lower edge of the network 100, each connect to a couple of the sources/sinks 130a-130h.

Each of the switches, 121a-121d, 122a-122d, 110A and 110B, may be any reasonably suitable switch for transferring data through one or more communication channels. Communication channels, for example, established through switch ports, of the switches, 121a-121d, 122a-122d, 110A and 110B, may each be controlled to be switched on or off or partially powered down. In partially powering down a communication channel, the respective switch may decrease a channel bandwidth of the communication channel (that is, reducing a channel capacity) to reduce power consumption of the switch. For example, the channel bandwidth of an Ethernet link of a switch may be lowered from 1 Giga bits per second (Gbit/s) to 100 Mega bits per second (Mbit/s) when data traffic through the switch does not require maintaining the 1 Gbit/s link and using more power. As an another example, the channel bandwidth of an Ethernet link of a switch may be lowered from 100 Mbit/s to 10 Mbit/s when data traffic through the switch does not require maintaining the 100 Mbit/s link. In switching off a communication channel of a switch, only the communication channel or port may be switched off without switching off the switch entirely. Alternatively, the entire switch other than parts for receiving network control signals from, for example, a system may be switched off. By having at least an entire switch or a communication channel thereof switched off or partially powered down, a reduction in the overall power consumption of the network 100 may be achieved.

In addition to determining which communication devices and/or communication channels thereof to switch off or partially power down as described above, a particular network path through the switches, 121a-121d, 122a-122d, 110A and 110B, for transmitting a network flow for a commodity such as data transferred through the network 100 for running an application on a source/sink may be selected for transmitting the network flow for the commodity as a part of a network configuration having the lowest overall power consumption of the network 100 among a plurality of network configurations. A flow for a commodity may be any reasonably suitable information flow on a network for a commodity such as a network flow for an application, an IP source address, an IP destination address, etc. The network 100 may be instructed not to allow the network flow to be split and flow through another network path through the network 100 of switches, 121a-121d, 122a-122d, 110A and 110B.

The sources/sinks 130a-130h may each be any reasonably suitable source/sink for receiving and/or outputting network data such as a server, data storage device, customer premise equipment, etc.

In describing data routing through the network 100, for example, data from the source/sink 130a operating as a source may be transmitted to the source/sink 130h operating as a sink through a network path 1 through the switches 121c, 121a, 110A, 122a, and 122d. In being routed through the network path 1, the data from the source/sink 130a is transmitted through a communication channel between the source/sink 130a and the edge switch 121c. After the edge switch 121c receives the data, the edge switch 121c transmits the data through a communication channel between the edge switch 121c and the upper switch 121a of the aggregation switch 121. After the upper switch 121a receives the data, the upper switch 121a transmits the data to the core switch 110a, which in turn transmits the data to the upper switch 122a of the aggregation switch 122. The upper switch 122a transmits the data to the edge switch 122d, which in turn transmits the data to the source/sink 130h operating as a sink.

Alternatively, the data from the source/sink 130a operating as a source may be routed to the source/sink 130h operating as a sink through any other route through the network 100 including a network path 2 through the switches 121c, 121b, 110B, 122b, and 122d. By selectively choosing network paths for communicating data, one or more communication channels of the switches, 121a-121d, 122a-122d, 110A and 110B, may be switched off or partially powered down to conserve power and thus achieve the lowest power consumption of the network 100. In switching off a communication channel of a switch, the entire switch may be switched off except for, for example, a part of the switch receiving control signals from a system. Alternatively, a communication channel of the switch may be switched off without switching off the switch. In having a communication channel of a switch switched off, another communication channel of the same switch or another switch may be assigned to handle the data transfer, where the overall power consumption of the network 100 may be reduced while satisfying data routing requests from different data sources or other network devices and other requirements. Rather than maintaining a larger number of communication channels and/or switches switched on, a network configuration with a smaller number of switched-on communication channels and/or switches may handle the same amount of data routing requests from various sources and other requirements and reduce the overall network power consumption.

Figure 2:
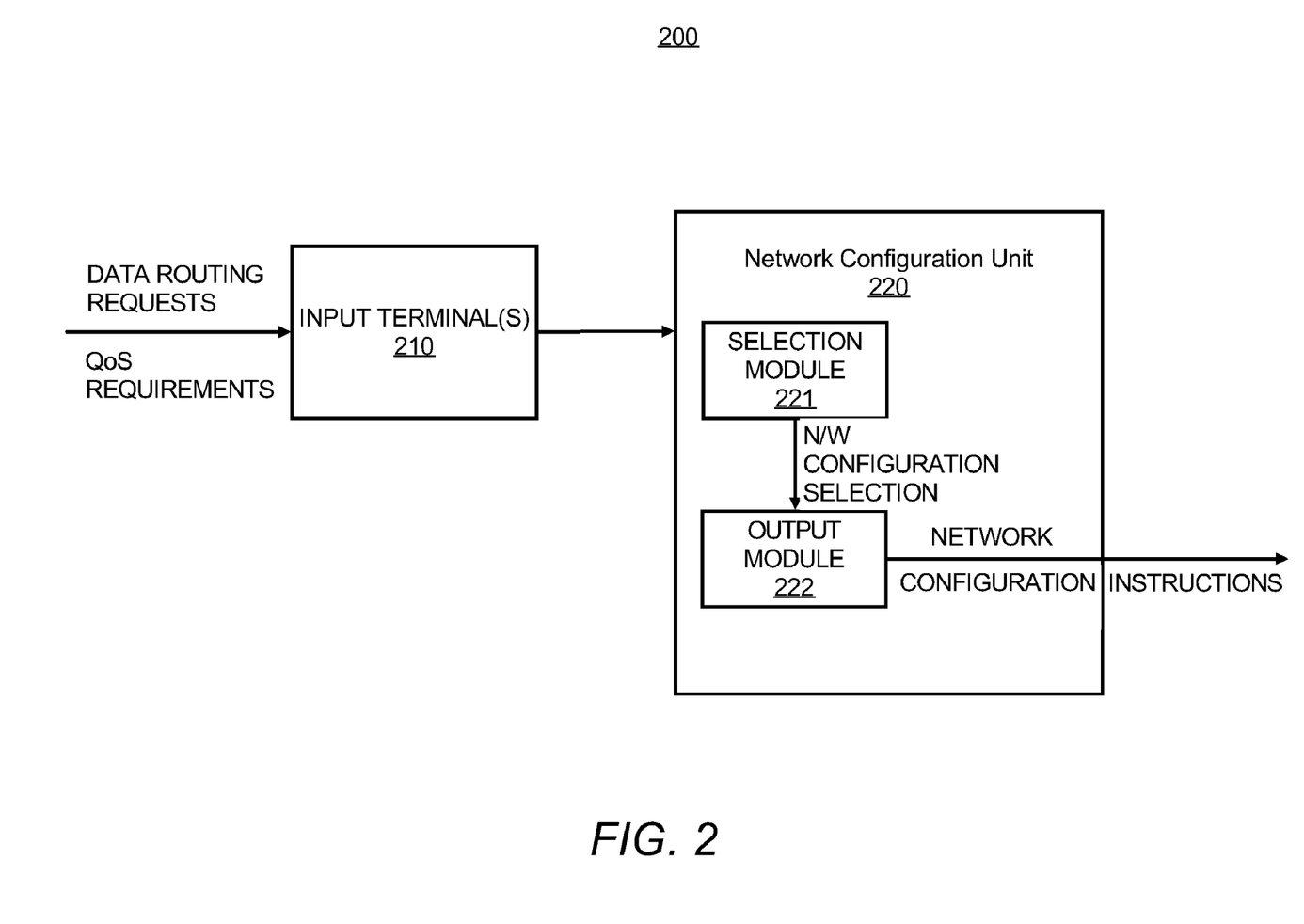
FIG. 2 illustrates a system including input terminals and a network configuration unit according to an embodiment of the invention.

Turning now to FIG. 2, shown therein is a system 200 including one or more terminals 210 and a network configuration unit 220 according to an embodiment of the invention. It should be understood that the system 200 may include additional components and that some of the components described herein may be removed and/or modified without departing from a scope of the system 200. The system 200 may be a separate structure from the network 100 or may form a part of the network 100, for example, by being integrated into one or more of the switches 121-122 and 110A-110B or having a separate structure in the network 100, which is designated to perform functions of the system 200.

The terminals 210 may each be any reasonably suitable terminal for receiving network information such as requests from sources or other network devices for routing data through a network, QoS requirements associated with the routed data, information on a network topology, other requirements, etc.

The network configuration unit 220 may be any reasonably suitable unit for receiving network information, processing the network information, and outputting instructions to configure the network 100 to achieve a lowest overall power consumption in routing network data while satisfying data routing requests and other requirements.

The network configuration unit 210 includes a selection module 221 and an output module 222. Each module may be implemented as software, hardware, or a combination of both for performing functions of the module such as a computer program having instructions for performing functions of the module that are stored on a computer readable data storage medium.

The selection module 221 may be any reasonably suitable module for selecting a network configuration with the lowest overall power consumption in the network 100 among multiple network configurations. For example, by at least partially powering down one or more communication channels of the network 100 that are either idle or assigned for data transfer and by assigning other communication channels/switches to handle any higher traffic load that results, the lowest overall power consumption of the network 100 among a plurality of network configurations may be achieved. In selecting a network configuration with the lowest overall power consumption, the selection module 221 makes the selection based on network information received from the switches 121-122 and 110A-110B, the sources/sinks 130a-130h, etc., such as requests for routing data through the network 100, QoS or other requirements that are associated with the routed data as received from the sources/sinks 130a-130h or the switches 121-122 and 110A-110B, etc. In selecting a network configuration based on the received network information, the selection module 221 may use any reasonably suitable way of selecting a network configuration such as a multi-commodity flow problem, other ways of selecting a network configuration based on network information, etc.

According to an embodiment, the problem of selecting a network configuration to optimize for power savings is characterized as a multi-commodity flow problem. The multi-commodity flow problem is a network flow problem with multiple commodities (or goods) flowing through the network between different source and sink nodes. Describing the multi-commodity problem in more detail, in a flow network G(V,E), an edge (u,v)∈E has capacity c(u,v). There are k commodities $K_1, K_2, \ldots, K_k$, where $K_i=(s_i, t_i, d_i)$, $s_i$ and $t_i$ are the source and sink of a commodity i, and $d_i$ is the demand. An assignment of flow f satisfies the following constraints:

$$\text{Capacity constraint:} \sum_{i=1}^{k} f_i(u, v) \le c(u, v)$$

$$\text{Flow conservation:} \sum_{w \in V} f_i(u, w) = 0 \text{ when } u \ne s_i, t_i$$

$$\text{Demand satisfaction:} \sum_{w \in V} f_i(s_i, w) = \sum_{w \in V} f_i(w, t_i) = d_i$$

Describing the above-described constraints more specifically, the capacity constraint is that a sum of all flows f for commodities in each link does not exceed an edge capacity. The flow conservation constraint is that flows for commodities are neither created or destroyed at intermediate nodes. A back edge acts like a supply edge. Demand satisfaction constraint is that each source and sink sends or receives, respectively, an amount equal to its demand.

Additional constraints are as follows.
(1) Deactivated links have no traffic:

$$Xu,v=0 \rightarrow f_i(u,v)=0, \forall i.$$

(2) Deactivated switches have no active links:

$$\forall u \in V, Yu=0 \rightarrow \Sigma_{w \in V} Xw,u=0.$$

(3) Links with no traffic may be turned off.
(4) Both halves of an Ethernet link are powered on if traffic is flowing in either direction.
(5) When all links connecting to a switch are switched off, the switch may be completely powered off (that is, except for, for example, a switch part that receives control signals from the system 200).

Based on the above-described constraints, the selection module 221 may minimize the following value:

$$\Sigma_{(u,v) \in E} X_{u,v} \cdot a(u,v) + \Sigma_{u \in V} Y_u \times b(u)$$

Such a minimization is equivalent to a minimization of link power+switch power. In determining a network configuration that satisfies the above-described minimization of the sum of link power and switch power for all switches in the network 100, the selection module 221 selects a network configuration with the lowest overall power consumption in the network 100 among a plurality of network configurations. As described above, such a selection may include at least partially powering down one or more communication channels and/or switches in favor of shifting data traffic load to other communication channels and/or switches to reduce the overall power consumption of the network 100. Also, the selection may include selecting a network path through the switches 110A-B and 121-122 (e.g., the network path 1 as opposed to the network path 2) for transmitting a network flow for a commodity such as network data transferred through the network 100 for running an application on a source/sink. By selecting a best network path for transmitting the network flow through the switches 110A-B and 120*a-d*, the overall power consumption through the network 100 in trafficking network flows for different data routing requests may be minimized. In response to the selection of the network path for transmitting the network flow, the network 100 may not allow the network flow to be split and flow through another network path of the network 100. By allowing the network flow for the commodity to be split, it might be possible to get a lower power consumption configuration though it might impact the data-throughput of the network 100. The above-described flow splitting may be prevented by adding an additional constraint to the above-described multi-commodity flow problem that data traffic on a link for a flow of a commodity is equal to either the full data to be routed from a source or zero.

The output module 222 outputs instruction signals to perform a network configuration of the network 100 in response to a selection made by the selection module, where the selection is of the network configuration that allows the network 100 to have a lowest overall power consumption of the network 100 among a plurality of network configurations. The instruction signals may be transmitted through the one or more terminals 210 for receiving network information if the terminals 210 are input/output terminals or through separate, one or more output terminals (not shown).

In response to the instruction signals from the output module 222, the switches 110A-B and 121-122 configure themselves to have the lowest overall power consumption of the network 100 among a plurality of network configurations of the network 100.

Figure 3:
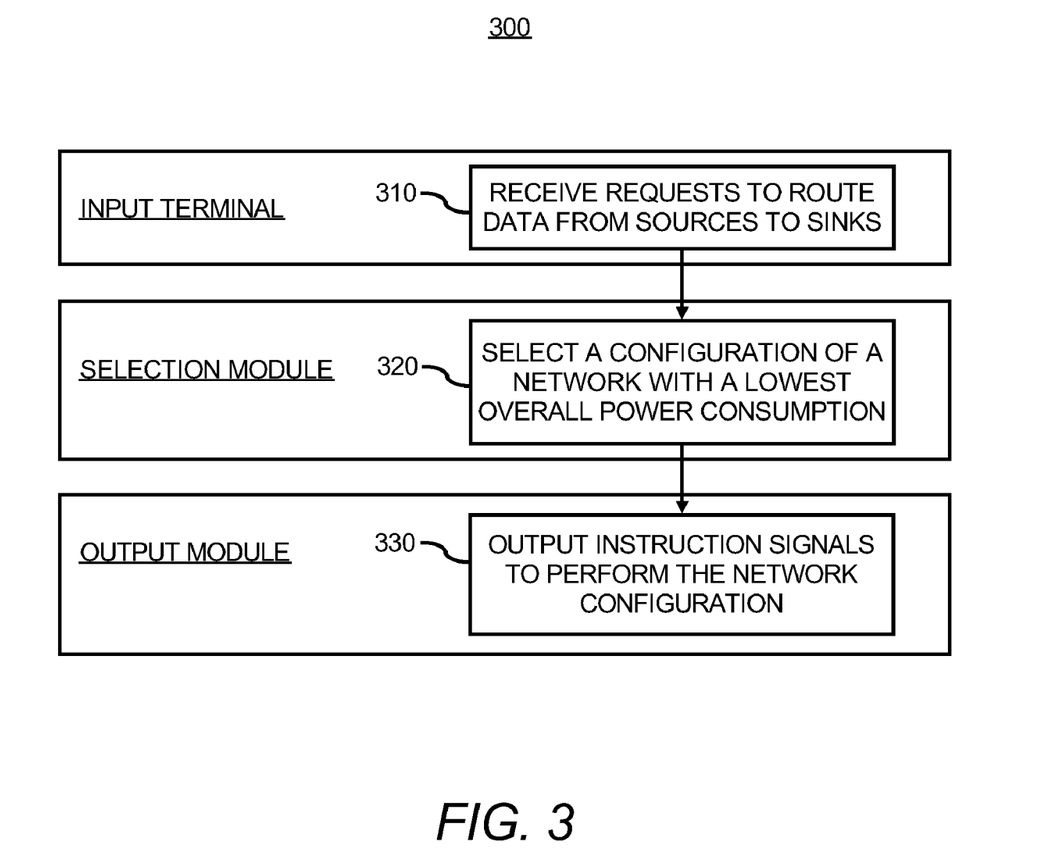
FIG. 3 illustrates a method performed by at least one or more computer readable data storage mediums for controlling power consumption of a network according to an embodiment of the invention.

Turning now to FIG. 3, shown therein are steps of a method 300 performed by at least one or more computer readable data storage mediums for controlling power consumption of a network according to an embodiment of the invention. It should be apparent to those of ordinary skill in the art that other steps may be added or existing steps may be removed, modified or rearranged without departing from a scope of the method 300.

At step 310, the terminal(s) 210 receives requests to route data from the sources/sinks 130*a*-130*h* that are operating as sources to the sources/sinks 130*a*-130*h* that are operating as sinks.

At step 320, in the network configuration unit 220, the selection module 221 selects a configuration of the network 100 that allows the network to have a lowest overall power consumption of the network 100 among a plurality of configurations of the network 100. The selection is made based on the data routing requests from the data sources.

At step 330, in the network configuration unit 220, the output module 222 outputs instruction signals to the switches, 121*a*-121*d*, 122*a*-122*d*, 110A and 110B, of the network 100 to perform the network configuration.

Figure 4:
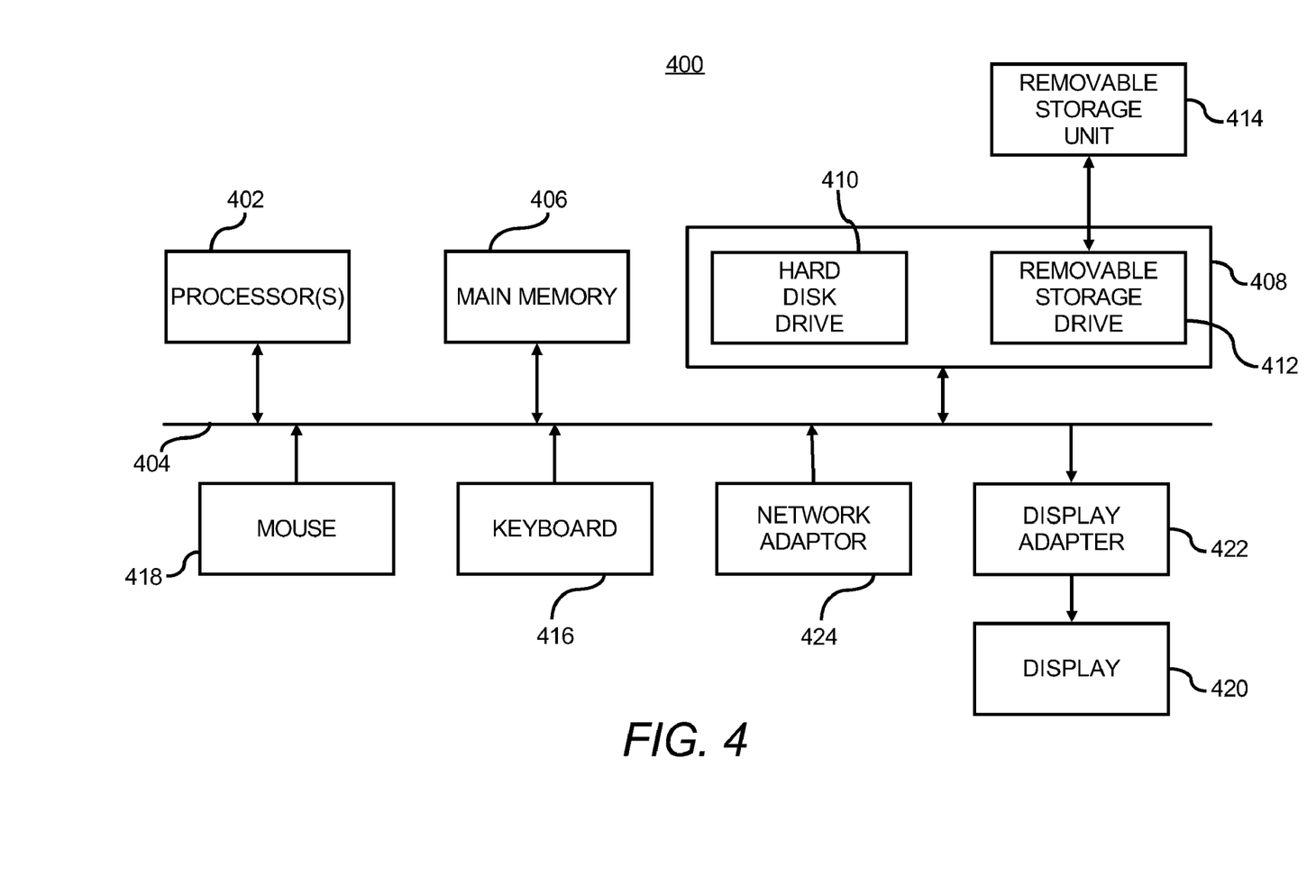
FIG. 4 illustrates a block diagram of a computing apparatus configured to implement or execute any one or more modules, applications or programs according to an embodiment of the invention.

Turning now to FIG. 4, there is shown a block diagram of a computing apparatus 400 configured to implement or execute any one or more modules, applications or programs of the network 100, the system 200, the method 300 depicted in FIGS. 1-3 according to an embodiment of the invention. In this respect, the computing apparatus 400 may be used as a platform for executing any one or more functions described above with respect to any one or more modules, applications or programs of the network 100, the system 200, and the method 300.

The computing apparatus 400 includes a processor 402 that may implement or execute functions of one or more steps described in the method 300 and functions of the network 100 and the system 200. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the network 100, the system 200, and/or the method 300 may be stored.

The removable storage drive 412 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

Any one or more of the above-described operations of the network 100, the system 200, and the method 300 in FIGS. 1-3 may be contained as a computer program product embodied on one or more tangible computer readable storage mediums. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

While exemplary features and embodiments of FIGS. 1-3 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A system for controlling power consumption of a network, the system comprising:
   at least one terminal to receive a plurality of requests to route data from a plurality of data sources to a plurality of data sinks, wherein the data sources and the data sinks are connected to each other through a plurality of network nodes forming the network; and a network configuration unit including:
  a selection module configured to select a configuration of the network nodes that allows the network to have a lowest overall power consumption of the network among a plurality of configurations of the network, wherein the selection is made based on the data routing requests from the data sources, and
  configured to select a network path for transmitting a network flow, wherein the selecting comprises:
    characterizing a problem of selecting the network path as multi-commodity flow problem,
    constraining the multi-commodity flow problem with constraints including that deactivated links in the network have no traffic and that the network flow is transmitted on the selected path and is not allowed to be split to flow through another network path, and
    determining a solution to the multi-commodity flow problem that satisfies the constraints; and
  an output module configured to output a plurality of instruction signals to the network nodes to perform the network configuration.

2. The system of claim 1, wherein the plurality of network nodes includes a plurality of network switches and the plurality of instruction signals include an instruction signal to switch off a communication channel of at least one of the network switches in order to allow the network to have the lowest overall power consumption.

3. The system of claim 1, wherein the plurality of instruction signals include an instruction signal to partially power down a communication channel of at least one of the network nodes to reduce a channel bandwidth of the communication channel in order to allow the network to have the lowest overall power consumption.

4. The system of claim 1, wherein the plurality of network configurations correspond to different combinations of the network nodes that are to be at least partially powered down, respectively.

5. The system of claim 1, wherein the network flow is configured to be used for running an application of a data sink of the network.

6. The system of claim 1, wherein the selection of the network path is responsive to an outcome of a multi-commodity flow problem with a condition that data traffic on a communication channel for a network flow for a commodity is equal to either a full requested data amount to be routed from a data source or zero.

7. The system of claim 1, wherein the plurality of network nodes includes a plurality of network switches and the plurality of instruction signals includes an instruction signal to switch off a communication port of at least one of the network switches in order to allow the network to have the lowest overall power consumption.

8. The system of claim 1, wherein the selection module is further configured to select the network configuration based on quality of service (QoS) requirements in routing the data.

9. The system of claim 1, wherein the at least one terminal is configured to receive information as to a topology of the network and the selection based on the data routing requests is configured to be made based on the information as to the network topology.

10. The system of claim 1, wherein the plurality of instruction signals includes instruction signals to switch off at least one of the network nodes in order to allow the network to have the lowest overall power consumption.

11. A non-transitory computer readable data storage mediums storing instructions for controlling power consumption of a network, the instructions executable by a processing resource to:
  receive a plurality of requests to route data from a plurality of data sources to a plurality of data sinks, wherein the data sources and the data sinks are connected to each other through a plurality of network nodes forming the network;
  select a configuration of the network nodes that allows the network to have a lowest overall power consumption of the network among a plurality of configurations of the network, wherein the selection is made based on the data routing requests from the data sources;
  select a network path for transmitting a network flow, wherein to select comprises:
    characterize a problem of selecting the network path as a multi-commodity flow problem,
    constrain the multi-commodity flow problem with constraints including that deactivated links in the network have no traffic and that the network flow is transmitted on the selected path and is not allowed to be split to flow through another network path, and
    determine a solution to the multi-commodity flow problem that satisfies the constraints; and
  output a plurality of instruction signals to the network nodes to perform the network configuration.

12. The non-transitory computer readable medium of claim 11, wherein the plurality of network nodes includes a plurality of network switches and the plurality of instruction signals includes an instruction signal to switch off a communication channel of at least one of the network switches in order to allow the network to have the lowest overall power consumption.

13. The non-transitory computer readable medium of claim 11, wherein the plurality of instruction signals includes an instruction signal to partially power down a communication channel of at least one of the network nodes to reduce a channel bandwidth of the communication channel in order to allow the network to have the lowest overall power consumption.

14. The non-transitory computer readable medium of claim 11, wherein the plurality of network configurations corresponds to different combinations of the network nodes that are to be at least partially powered down, respectively, by performing at least one of the actions such as switching off a port, reducing a channel capacity of a port, and switching off a network node.

15. The non-transitory computer readable medium of claim 11, wherein the constraints to constrain the multi-commodity flow problem further include capacity, demand and flow conservation constraints.

16. A non-transitory computer readable data storage medium storing instructions for controlling power consumption of a network, the instructions executable by a processing resource to:
  receive a plurality of requests to route data from a plurality of data sources to a plurality of data sinks, wherein the data sources and the data sinks are connected to each other through a plurality of network nodes forming the network; and
  select a configuration of the network nodes that allows the network to have a lowest overall power consumption of the network among a plurality of configurations of the network, wherein the selection is made based on the data routing requests from the data sources, wherein the selection includes a selection of a communication channel of at least one of the network nodes to be switched off;

select a network path for transmitting a network flow, wherein to select comprises characterize a problem of selecting the network path as multi-commodity flow problem, characterize the multi-commodity flow problem with constraints including that deactivated links in the network have no traffic and that the network flow is transmitted on the selected path and is not allowed to be split to flow through another network path, and determine a solution to the multi-commodity flow problem that satisfies the constraints; and output a plurality of instruction signals to the network nodes to perform the network configuration.

17. The non-transitory computer readable medium of claim 16, wherein the plurality of network nodes includes a plurality of network switches and the plurality of instruction signals includes an instruction signal to switch off a communication channel of at least one of the network switches in order to allow the network to have the lowest overall power consumption.

18. The non-transitory computer readable medium of claim 16, wherein the plurality of instruction signals include an instruction signal to partially power down a communication channel of at least one of the network nodes to reduce a channel bandwidth of the communication channel in order to allow the network to have the lowest overall power consumption.

19. The non-transitory computer readable medium of claim 16, wherein the plurality of network con figurations corresponds to different combinations of the network nodes that are to be at least partially powered down, respectively, by performing at least one of the actions such as switching off a port, reducing a channel capacity of a port, and switching off a network node.

20. The non-transitory computer readable medium of claim 16, wherein the constraints to constrain the multi-commodity flow problem further include capacity, demand and flow conservation constraints.

* * * * *

UNITED STATES PATENT AND TRADEMARK OFFICE
CERTIFICATE OF CORRECTION

PATENT NO. : 8,392,737 B2
APPLICATION NO. : 12/817907
DATED : March 5, 2013
INVENTOR(S) : Puneet Sharma et al.

Page 1 of 1

It is certified that error appears in the above-identified patent and that said Letters Patent is hereby corrected as shown below:

In the Claims

In column 10, lines 1-2, in Claim 11, delete "mediums" and insert -- medium --, therefor.

In column 12, line 12, in Claim 19, delete "con figurations" and insert -- configurations --, therefor.

Signed and Sealed this
Seventeenth Day of September, 2013

Teresa Stanek Rea
*Deputy Director of the United States Patent and Trademark Office*